United States Patent

Wiley

[11] 3,900,548

[45] Aug. 19, 1975

[54] COEXTRUSION OF POLYSTYRENE AND POLYSULFONES

[75] Inventor: Donald F. Wiley, Big Spring, Tex.

[73] Assignee: Cosden Oil & Chemical Company, Big Spring, Tex.

[22] Filed: Jan. 24, 1973

[21] Appl. No.: 326,240

[52] U.S. Cl. .............. 264/171; 156/244; 264/173; 425/133.5
[51] Int. Cl.² .............. B32B 27/30; B32B 27/08
[58] Field of Search............ 264;171;173/; 161/164, 161/165, 182; 156/244; 260/49; 425/131, 133.5

[56] References Cited
UNITED STATES PATENTS

| | | | |
|---|---|---|---|
| 3,432,588 | 3/1969 | Breidt, Jr. et al. | 264/171 |
| 3,476,627 | 11/1969 | Squires | 156/244 |
| 3,565,737 | 2/1971 | Lefevre et al. | 156/244 |
| 3,589,976 | 6/1971 | Erb | 156/244 |
| 3,769,150 | 10/1973 | King et al. | 161/182 |

OTHER PUBLICATIONS

"Flat Die Coextrusion," Modern Plastics, 4–1972, Thompka et al., pp. 62 & 63.

*Primary Examiner*—Jeffery R. Thurlow

[57] ABSTRACT

A process for the manufacture of composite sheeting having a layer of polystyrene and at least one layer of polysulfone polymer adhered thereto, comprising joining a molten stream of each of said polymeric materials in a conduit to form a single stratified stream of molten materials conforming to the cross-section of said conduit and having a relatively sharply defined interface between said polymeric materials, and passing said stratified stream of molten material through a sheet-form extrusion die having its die lips generally aligned with said interface between the two polymeric materials.

7 Claims, 4 Drawing Figures

3,900,548

COEXTRUSION OF POLYSTYRENE AND POLYSULFONES

BACKGROUND OF THE INVENTION

This invention relates to the production of multiple layer sheeting. More particularly, the present invention relates to the extrusion of plastic sheeting having a thin surface veneer of a second plastic material on at least one side thereof and to the compositions thereby produced.

Due to the particular properties of the many plastics, certain plastics are required for certain specific end applications and other plastics cannot be used in such applications. In many instances, due to this requirement of certain specific properties for particular applications, the cost of the plastic material is rather high as compared to similar plastics having somewhat different properties.

Within recent years, considerable effort has been made to find means of reducing the cost of these specialized plastics without an attendant loss of the properties which have made the plastics suitable for the particular uses in which they are employed. Among the means explored have been lamination or coextrusion together of different plastics to produce a composite. These techniques have in common the bringing together in layered form, sheets of two or more different plastic materials. In such manner, composite sheets may be produced having surface and other characteristics of the desired specialty plastic and yet by using a much cheaper substrate than the superstrate specialty plastic, the costs of the plastic sheet can be materially lowered.

In lamination, two or more previously extruded sheets of different plastics are brought together under pressure and temperature conditions or in the presence of adhesives in order to obtain adherence of the different plastic sheets to one another. This technique of forming composite sheets has a disadvantage of little flexibility in sheet thicknesses, requirement of extra extrusion equipment such as two or more regular extruders with attendant dies, rollers, sheet line, etc. Additionally, without the use of adhesives, adherence of the layers to one another is frequently unsatisfactory.

Coextrusion offers the least expensive means of preparing layered composite sheets of different plastics. Within coextrusion, two different techniques are most often employed. In one of these techniques, two or more plastic sheets are extruded from separate extruders through separate sheet dies into contact with one another while still hot and then passed through a single set of rollers or another extrusion die and down a single sheet line. Employing this technique, equipment requirements are still relatively large and there is still little flexibility and adherence is still quite frequently a problem with many plastics. The other coextrusion technique employs an adaptor or other means of bringing two or more different plastic materials from two or more extruders into contact with one another prior to their passage through an extrusion die.

One of the major problems in coextrusion techniques wherein the plastics to be coextruded are brought into contact with one another prior to passing through a die, has been the determination of conditions and means for bringing together components in a manner such as to produce upon extrusion through a sheet die, uniform layers while still obtaining the desired adherence of the plastic materials to one another. Additionally, prior coextrusion processes of this type have had limitations as to the relative thicknesses of the layers, requiring the minor or superstrate layer to represent at least 25 percent of the total volume of the composition.

It is now an object of the present invention to provide a new and improved process for coextrusion of a multiple layered sheeting.

Another object of the present invention is to provide a new and improved process for the coextrusion of two or more plastic materials into a composite sheeting whereby one or more of the layers may be very thin, representing less than 25 volume percent of the total composite.

A further object of the present invention is to provide a method of coextruding polystyrene and polysulfones.

A remaining object of the present invention is to provide a new and novel plastic composition having at least two layers of thermoplastic material, at least two of said plastic materials being polystyrene and polysulfone and being in contact with one another.

Additional objects will become apparent from the following description of the invention herein disclosed.

SUMMARY OF THE INVENTION

The present invention, which accomplishes these and other objects, in one of its embodiments is a process for producing composite sheeting having a major thickness of a first thermoplastic material and having a relatively thin protective layer of a second thermoplastic material. This process comprises combining in a conduit a first major extruded stream of molten polystyrene and a second minor extruded stream of a polymer which is predominantly a polysulfone to provide a composite stratified stream conforming to the cross section of the conduit and having adjacent layers extending longitudinally of the stream, with adjacent layers having a relatively sharply defined interface therebetween. The composite streams are thereafter passed through a sheet forming extrusion die having its die lips generally aligned with the aforementioned interface. In this process, the relative proportion of the polysulfone polymer forming the minor layer of the coextruded sheeting generally comprises less than about 25 percent by volume based upon the total thermoplastic material coextruded.

In another embodiment of the present invention, a composition is provided, said composition comprising a layered composite of at least two adjacent layers comprising a major and minor layer, said major layer being polystyrene and said minor layer being a polysulfone polymer. The major and minor layers are adhered to one another at the interface therebetween. Additional plastic materials may be adhered or coated upon the outer surfaces of said polystyrene and/or said polysulfone polymer.

DESCRIPTION OF THE PREFERRED EMBODIMENTS OF THE PRESENT INVENTION

Figure 1:
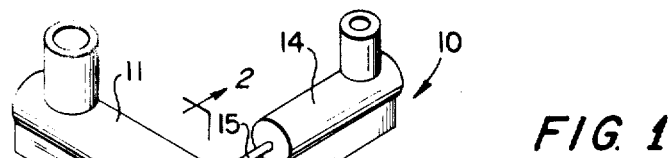
FIG. 1 of the drawings schematically represents an apparatus for the preparation of a multiple-layered sheet of film employing the method of the present invention.

In accordance with the present invention, it has been found that a multiple layered sheet or film may be produced from two polymeric materials which have hitherto been difficult to unite by conventional techniques. Specifically, the sheeting or film of the present invention consists of a layer of polystyrene having a thickness substantially corresponding to the final composite sheeting thickness desired, and adhered to either one or both sides of the polystyrene layer, a layer or layers of a polysulfone polymer composition. Therefore, there is provided a composite sheeting having the desirable economic characteristics of polystyrene and concurrently possessing the highly desirable surface and structural properties of polysulfone resins. Such composite materials characterized by the desirable surface and structural properties of the polysulfones are well suited for use in the fabrication of various appliances and in aircraft and automotive applications such as light bezels and the like, and in various other equipment such as battery cases, etc.

The term polystyrene, as employed herein, includes both homopolymers of styrene and copolymers of styrene with other polymerizable and polymerized monomers. Included within the latter category are impact polystyrenes which comprise graft copolymers of styrene with conjugated diene backbone polymers such as polybutadiene, butadiene-styrene copolymers, butadiene-acrylonitrile copolymers, natural rubber and the like. Also included in this category are normal copolymers of styrene with other well-known conventional monomers.

The polysulfone resins useful are those having the structural formula

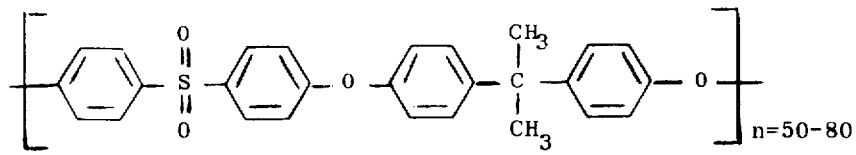

Such polysulfone resins are formed by the reaction of dichlorodiphenylsulfone and the sodium salt of bisphenol A. These polysulfone resins are rigid, strong thermoplastics and possess high tensile strength and high flexural modulus of elasticity. Polysulfones have very good heat deflection characteristics. Additionally, the polysulfone resins possess a wide temperature range at which their properties remain useful. These resins have a predictable and low shrinkage characteristic and polysulfones exhibit very little creep. A particularly useful group of polysulfone resins are marketed by Union Carbide under the trade name "Polyfone."

In a particularly useful embodiment of the present invention, polystyrene, either ordinary crystal or high impact, is mixed with the polysulfone and extruded through the extruder therewith. The amount of such polystyrene usually will be within the range of 10 to 90 percent by weight of the polysulfone. Preferably, the amount of polystyrene will be within the range of 50 to 80 percent by weight of the polysulfone. The extrusion of such amounts of polystyrene with the polysulfone does not materially detract from the normal properties of the polysulfones but does materially increase the adhesion of the polysulfone to the polystyrene.

The present extrusion process has been found operable to produce multi-layered sheeting having extremely thin surface layers of polysulfone, e.g., on the order of 1 mil. or less, in comparison to the total sheet thickness, e.g., 10 to 12 mils. This is achieved by providing relative feed rates of the polystyrene to the polysulfone such that the volume of polysulfone generally does not exceed about 25 percent, and preferably is less than about 20 percent of the total resin feed. Relative feed rates for the polysulfone of less than about 15 percent of the total resin feed are, typically, preferred even more.

The principles of the present invention generally are applicable to the manufacture of either multi-layer polymeric "film" (less than 10 mils. in thickness) or "sheeting" (10 mils. or thicker). However, polystyrene based film has not found widespread popularity because of the difficulties encountered in adapting this material to blown film apparatus conventionally employed together with extrusion equipment in the manufacture of film products. Therefore, while it is possible to produce a composite film having a 1 mil. or thinner surface layer of polysulfone on a 4 or 5 mil., or even a 1 mil. base layer of polystyrene, practically speaking, the products of most interest are multilayer sheets of from 10 mils. up to three-eighths inch in thickness having polysulfone resin surface layers measuring from a fraction, e.g., one-fourth to one-half mil. to several mils. Accordingly, it will be appreciated that the volumetric feed rates for the polysulfone component are frequently very small, e.g., less than 1 percent, when thicker sheeting is desired, and likewise that rates in excess of 20 percent or 25 percent are contemplated when very thin film is produced. Referring now to the drawings, in FIG. 1 there is schematically illustrated an apparatus, generally designated by the reference numeral 10, particularly adapted for the process of the present invention. The apparatus 10 comprises in cooperative combination a first extruder 11 for the extrusion of molten polystyrene, and connected thereto, a discharge conduit 12. A second extruder 14 having a discharge conduit 15 is adapted for providing a minor stream of molten polysulfone resin. Conduit 15 terminates at conduit 12 at a point upstream of the sheeting die 17 which is in operative communication with conduit 12 and receives the flow therefrom. Sheet 19 is formed at the die lips 18 and thereafter carried from the die by means of polished cooling rollers 21, 22 and 23.

Figure 2:
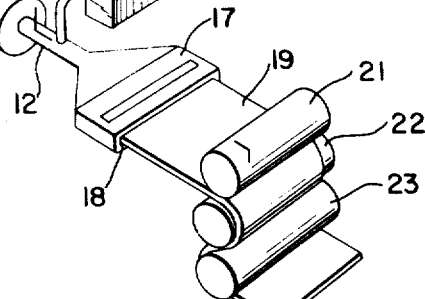
FIG. 2 of the drawings is a cross sectional view taken along the line 2—2 in FIG. 1.

In FIG. 2 there is illustrated a sectional view of the discharge conduits 12 and 15, extrusion die 17 and cooling roller arrangement 21, 22 and 23. This view illustrates the intersection of conduits 12 and 15, and the configuration of the polystyrene resin 31 and polysulfone resin 32 as they are combined in conduit 12 to form a stratified stream having an interfacial juncture plane 25. Stratification at the intersection point of the two resins is aided by metal plate 34 positioned in conduit 12 adjacent the entry point of coextruder discharge conduit 15. Similarly, there is illustrated the passage of the stratified resin stream into the die manifold 27, past restricter bar 28 and ultimately through the extruder die lips 18 to the chrome or cooling roller assembly. Throughout this entire traversal of the extrusion equipment, it is noted that the individual layers of resinous material maintain their stratified relationship, despite the minute proportion of polysulfone, to form a final product having an essentially uniform surface layer of this material.

Figure 3:
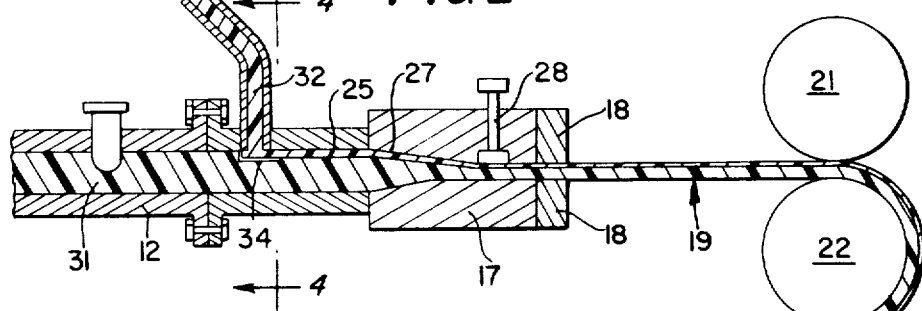
FIG. 3 of the drawings is a top view, in section, of the extrusion die and lead end conduit portion of the apparatus illustrated in FIG. 1.
Figure 4:
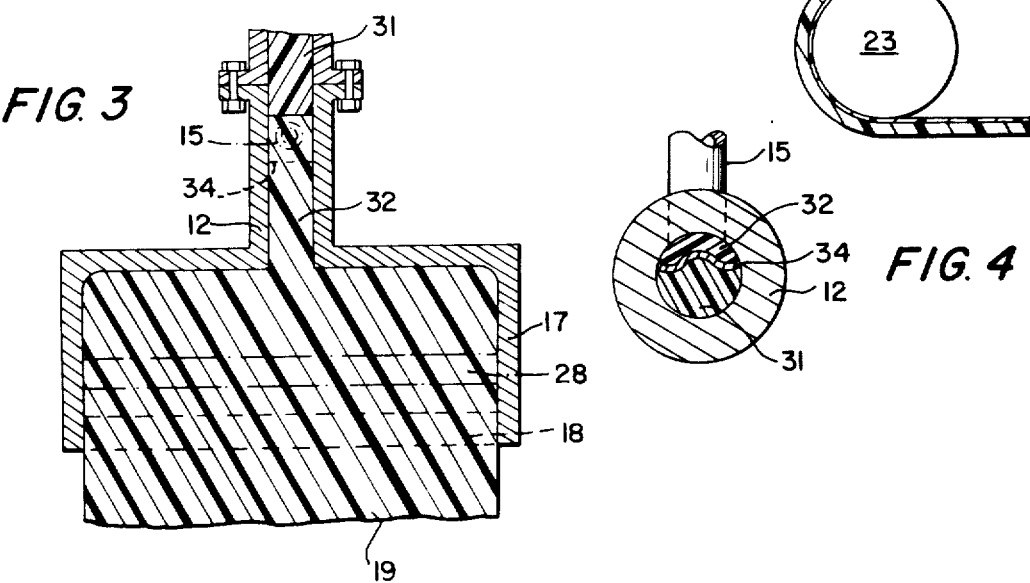
FIG. 4 of the drawings is a cross sectional view taken along the line 4—4 in FIG. 2.

In FIG. 3 is illustrated a top view of the conduit 12 and extrusion die 17 to demonstrate the lateral flow pattern of molten polymeric material as it passes into and through the extrusion die. FIG. 4 illustrates more clearly the preferred configuration of metal plate 34 positioned in conduit 12.

To produce a multi-layered sheet or film having a satisfactory degree of adherence between layers, it is necessary to observe certain process limitations during the extrusion procedure. While it is of course desirable to provide relatively steady flow of polystyrene and polysulfone resin through the apparatus and to avoid any turbulence therein, these limitations are rather typical in most extrusion processes employing highly viscous synthetic resins. More important limitations (although not wholly unrelated to the foregoing) reside in the extrusion temperatures for the polystyrene and polysulfone, and the temperature maintained in the extrusion die. The extrusion of the polystyrene from extruder 11 into conduit 12 should be carried out at a temperature of from about 440°F. to about 480°F., whereas the polysulfone should be discharged from extruder 14 at a temperature of from about 540°F. to 565°F. This range is not intended to be an absolute limitation on the invention, but rather indicates only the median range wherein the melt viscosity of the polysulfone resin may be rendered proximate to the melt viscosity of polystyrene so as to provide strong adherence between layers in the extruded sheet. It is to be understood that the invention would likewise embody within its scope the use of polysulfone resins which might be extruded at even higher temperatures to produce satisfactory adherence to the polystyrene substrate co-extrudate.

As indicated, die temperature also is an important process variable. This parameter particularly affects the surface characteristics, e.g., gloss, surface smoothness, etc., of the extruded sheet. Die temperatures should be maintained relatively constant during extrusion, with typical values thereof for coextrusion of polysulfone and polystyrene ranging between about 425°F. and 600°F. The best characteristics are attained with temperatures above about 445°F.

In the coextrusion of polystyrene and polysulfone the conditions maintained at the cooling roller assembly also affect the properties of the final product. The manufacture of smooth sheeting normally requires the use of highly polished rollers, e.g., chrome, typically three in number, each being approximately 12 inches in diameter and being adapted for internal circulation of cooling water. When polysulfone is coextruded as a surface layer, however, it has been found that a slightly higher than normal top roll temperature, e.g., 150°F., as well as a lower than normal top roll pressure, e.g., 20 p.s.i., approximately enough to overcome upward spring tension on the rollers, are required to achieve optimum characteristics.

Other processing variables of lesser importance include the pressures at which the polystyrene and polysulfone are separately extruded before combination. These pressures typically fall within the range of 1,950 and 2,400 p.s.i. for the polysulfone stream. Of course, the downstream pressure at the point where the streams intersect is equal in both streams.

EXAMPLE

A main resin stream of impact polystyrene (Cosden Oil & Chemical Company 825D pellets) is extruded from a 4 ½ inch diameter two stage vented extruder containing a 4:1 compression ratio screw. A 1 ¼ inch diameter 24:1 single stage side extruder also having a 4:1 compression ratio screw is arranged as illustrated in FIGS. 1 and 2 and supplies a second stream of a polysulfone-polystyrene mixture. The polysulfone is one marketed by Union Carbide Co. as Polyfone and has a specific gravity at 200°F. of 1.24, heat defection temperature at 500 p.s.i. of 345°F. The polystyrene in the mixture was the above mentioned 825D and the weight percent of polystyrene in the mixture was 50%. The polystyrene is extruded at a temperature of 465°F. and a feed rate of approximately 600 lbs/hr. The polysulfone side stream is discharged from the 1 ¼ inch extruder at 550°F. and at a feed rate of approximately 100 lbs/hr.

The two resinous streams are then combined in the discharge conduit of the 4 1/2 inch diameter extruder utilizing a baffle plate arrangement illustrated in FIG. 4. There results a single stratified bi-component stream having a horizontal juncture plane between the polystyrene and polysulfone. The bi-component stream is conducted to a center-fed sheet-form extrusion die which opens to an extrusion slit 37 inches wide with its lips set at approximately 59 mils. The die temperature averaged about 570°. Upon leaving the die lips, the extruded sheet passes through a series of three 12 inch polished chrome cooling rolls, the top roll maintained at 140°F., middle roll at 170°F. and bottom roll at 140°F. Roll pressures were maintained at about 20 p.s.i. for top roll, 20 p.s.i. for middle roll and 25 p.s.i. for bottom roll. The roll gap setting was 40 mils. The polishing and subsequent rubber rolls are operated at about 10% and 10%, respectively, excess speed to stretch the extruded sheet to a final thickness of 40 mils.

Examination of the final sheeting product evidences an essentially uniform layer of polysulfone approximately 5 mils thick firmly adhered to the impact polystyrene base layer. This thickness corresponds closely with the relative feed rates for the two resins.

Thus, there has been provided according to the invention a process for co-extruding multi-layered sheeting of polystyrene and polysulfone wherein at least one polysulfone layer is adhered to the polystyrene base layer. Moreover, the subject process enables the production of multi-layered film or sheeting of polystyrene having very thin, e.g., 5 mils and less, surface layers of polysulfone.

While the fundamental novel features and advantages of the invention have been pointed out in connection with a single illustrated embodiment thereof, it will be appreciated that various modifications of the coex-

What is claimed is:

1. A process for the manufacture of composite sheeting having a major base layer of polystyrene and at least one relatively thin surface layer of polysulfone polymer adhered thereto, comprising extruding a heat plastified stream of polystyrene at a temperature of from about 440°F. to about 480°F., extruding a heat plastified stream of polysulfone polymer at a temperature of from about 540°F. to about 565°F., conveying said heat plastified stream of styrene polymer in a conduit having a generally circular cross-section, joining to the exterior surface of said styrene polymer stream within said conduit said heat plastified stream of polysulfone polymer, thereby forming a single stratified stream of heat plastified materials conforming to the cross-section of said conduit and being characterized by distinct, contiguous layers of said two polymeric materials having a relatively sharply defined interface therebetween, said interface terminating at each end at a point on the inside surface of said conduit, the relative volumetric proportion of the polysulfone polymer in said stratified stream being less than about 20 percent based upon the total polymeric material, and passing said stratified stream of heat plastified material through a sheet-form extrusion die, said die having a die orifice width substantially greater than the diameter of said conduit and having its die lips generally transversely aligned with said interface between the two polymeric materials.

2. The process as defined by claim 1, wherein the relative volumetric portion of the polysulfone polymer is less than about 15 percent based upon the total polymeric material.

3. The process as defined by claim 1, wherein the extrusion die is maintained at a temperature of from about 440°F. to about 450°F.

4. The process as defined by claim 1, wherein said polystyrene is crystalline polystyrene.

5. The process as defined by claim 1, wherein said polystyrene is impact polystyrene.

6. The process as defined by claim 1, wherein said polysulfone is a polymer having the structural formula

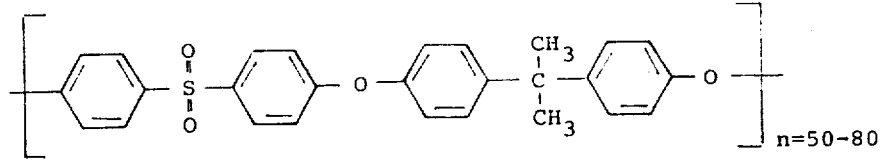

7. The process as defined by claim 6, wherein said polysulfone polymer further comprises between about 10 and 90 percent by weight of polystyrene with respect to the polysulfone admixed therewith.

* * * * *